US006834384B2

(12) United States Patent
Fiorella, III et al.

(10) Patent No.: US 6,834,384 B2
(45) Date of Patent: Dec. 21, 2004

(54) METHODS AND APPARATUS FOR UPGRADING FIRMWARE IN AN EMBEDDED SYSTEM

(75) Inventors: Daniel Charles Fiorella, III, Blue Bell, PA (US); Ronald L. Gebhardt, Jr., Delran, NJ (US); Marlin F. McGregor, Jr., Berwyn, PA (US)

(73) Assignee: General Instrument Corporation, Horsham, PA (US)

( * ) Notice: Subject to any disclaimer, the term of this patent is extended or adjusted under 35 U.S.C. 154(b) by 639 days.

(21) Appl. No.: 09/808,370

(22) Filed: Mar. 14, 2001

(65) Prior Publication Data

US 2002/0170050 A1 Nov. 14, 2002

(51) Int. Cl.[7] .................................................. G06F 9/44
(52) U.S. Cl. ...................................... 717/169; 717/175
(58) Field of Search ................................ 717/168–178, 717/122; 711/100–111, 1–6, 128–130, 152–159, 170–173, 205–210, 270; 712/2–9, 13–15, 36–40, 204, 233; 710/260–269; 714/6–9, 34, 35, 41, 42, 758, 759, 765–769

(56) References Cited

U.S. PATENT DOCUMENTS

| 4,439,839 | A |   | 3/1984 | Kneib et al. |
|---|---|---|---|---|
| 5,367,658 | A | * | 11/1994 | Spear et al. ................. 711/163 |
| 5,452,339 | A |   | 9/1995 | Siu et al. |
| 6,275,931 | B1 | * | 8/2001 | Narayanaswamy et al. ..... 713/2 |
| 6,640,334 | B1 | * | 10/2003 | Rasmussen .................. 717/171 |

FOREIGN PATENT DOCUMENTS

| GB | 2227584 A | * | 8/1990 | ........... G06F/12/12 |
|---|---|---|---|---|
| WO | WO 9212478 | * | 7/1992 | |

OTHER PUBLICATIONS

Grundmann, "Flash Memory Technology and Techniques", Embedded Systems Conference 1999, Intel Corporation, pp. 1–18.*
*AM–OMNI–ALM–Advanced Laser Module Installation and Operation Manual*, General Instrument Corporation, Feb. 1999 (45 pages).
Intel Corporation "80C186XL/80C188XL Microprocessor User's Manual," XP–002259862, 1995, 6 pages.

* cited by examiner

*Primary Examiner*—Antony Nguyen-Ba
*Assistant Examiner*—Ted T. Vo
(74) *Attorney, Agent, or Firm*—Barry R. Lipsitz; Douglas M. McAllister

(57) ABSTRACT

The present invention provides methods and apparatus for upgrading firmware in an embedded system, without impacting the system. More specifically, the present invention enables an embedded system to be upgraded without any system downtime, by providing two application areas in non-volatile programmable read only memory. A processor can boot up and run from either application area. A fixed vector table is provided, which, in cooperation with a software vector table, enables the processor to maintain proper interrupt vector addresses while being able to run from either application area. Upgraded firmware can be loaded into one application area while the system is running from the other application area. Resetting the processor allows the system to run the upgraded version of firmware.

14 Claims, 3 Drawing Sheets

METHODS AND APPARATUS FOR UPGRADING FIRMWARE IN AN EMBEDDED SYSTEM

BACKGROUND OF THE INVENTION

The present invention relates generally to embedded systems. In particular, the present invention provides methods and apparatus for upgrading firmware in an embedded system, without impacting the system. More specifically, the present invention enables an embedded system to be upgraded without any system downtime, by providing two banks of memory (application areas) in non-volatile programmable read only memory. A processor can boot up and run from either application area. A fixed vector table is provided, which, in cooperation with a software vector table, enables the processor to maintain proper interrupt vector addresses while being able to run from either application area. Upgraded firmware can be loaded into one application area while the system is running from the other application area. Resetting the processor allows the system to run the upgraded version of firmware.

A conventional embedded system is made up of three parts. A processor to run the code, a non-volatile memory to store the code, and a volatile memory to store data and temporary information the code uses. In most systems the volatile memory is random access memory (RAM) and the non-volatile memory is programmable read only memory (PROM). Variations of the PROM are the erasable programmable read only memory (EPROM) and the electrically erasable programmable read only memory (EEPROM). The processor could be any one of the thousands of commercially available parts chosen to suit the needs of the designer.

A number of years ago a new EPROM variation was developed, called flash electrically erasable programmable read only memory, or FLASH. FLASH provided fast re-programmability. FLASH was embedded in many systems to enable a user to reload code and to change the system to make improvements or bug fixes.

In a prior art embedded system developed by General Instrument Corporation of Horsham, Pa., USA, the assignee of the present invention, FLASH memory was used to enable quicker system upgrades. In this prior art embedded system, the FLASH memory was partitioned into two parts. The first half of FLASH was loaded with the present version of firmware. If an upgrade was required, the second half of FLASH was erased and loaded with a new version of firmware. The unit could then be reset and the code now operated out of the second half of FLASH. If a newer version of firmware was required the process could be repeated over and over again, always reloading the second half of FLASH and keeping the first half of FLASH as a fail-safe backup copy of the firmware.

The above process was accomplished by having an additional RAM on the circuit board. When the unit is first started, the processor checks a non-volatile memory location to determine which half to load from. It then loads the RAM from the selected section of the FLASH. The processor from this point on uses the RAM for code storage and data storage. This enabled the FLASH to be reprogrammed while the system was running. However, to facilitate this copying and reprogramming, additional circuitry was required on the board to: 1) control the addressing of the FLASH and RAM; 2) control the addressing of external data ports; and 3) control the location of the interrupt vector table (vector table). As a result, the parts count and board space requirements of such a system were increased.

The vector table holds the addresses of all the interrupt service routines (ISR). These ISRs are critical to the functioning of a system. An example of an ISR would be a timer or a clock. At predefined intervals the clock or timer expires and a register that maintains the time must be updated. This must happen quickly. If a register is not updated quickly, the clock would be wrong or a predefined event would not occur, causing an error. The way a computer insures that these kinds of errors do not occur is by using interrupts. An interrupt is a signal that interrupts the normal flow of instructions. For example, when a timer expires, a hardware interrupt is generated. The computer then jumps to a predefined address and executes the code at that point. The code at that point is called an ISR. These routines are very concise. After the ISR is executed, the code then returns to the point it was at before the interrupt occurred. The predefined address that the hardware jumps to when an interrupt is generated is maintained in the vector table. Each interrupt must have an entry in the vector table. In some systems the vector table is fixed to a certain location in the memory map. In others, it can be relocated by software.

In systems where the vector table is a fixed vector table, problems arise when the processor is provided with the ability to load from two different banks of code which may be running two different versions of firmware. Because the ISR's starting address could be different in each version of firmware, the entries in the vector table would be different.

It would be advantageous to be able to run firmware from either bank of memory while still maintaining the fixed vector table. It would also be advantageous to provide a fixed vector table that is adaptable to any future version of the firmware. It would be further advantageous to be able to upgrade the firmware in one bank of memory while the system is running, without impacting the system performance. It would be even further advantageous to provide the above advantages in a single chip, thereby saving board space, reducing parts count, and reducing costs.

The methods and apparatus of the present invention provide the aforesaid and other advantages.

SUMMARY OF THE INVENTION

The present invention provides methods and apparatus for upgrading firmware in an embedded system, without impacting the system. More specifically, the present invention enables an embedded system to be upgraded without any system downtime, by providing two application areas in non-volatile programmable read only memory. A processor can boot up and run from either application area. A fixed vector table is provided, which, in cooperation with a software vector table, enables the processor to maintain proper interrupt vector addresses while being able to run from either application area. Upgraded firmware can be loaded into one application area while the system is running from the other application area. Resetting the processor allows the system to run the upgraded version of firmware.

In an example embodiment of the invention, a processor may be provided for use in an embedded system. A non-volatile programmable read only memory device may be provided which has a fixed vector table, a boot area for storing boot code, a first application area for storing firmware, and a second application area for storing firmware. A random access memory device (RAM) may be provided having a software vector table and a RAM application area. The fixed vector table may be programmed with a reset vector address and interrupt vector addresses. The reset vector address may point to the boot code in the boot area and the interrupt vector addresses may point to corresponding interrupt vector addresses in the software vector table. An upgraded version of firmware may be loaded into one of the first application area or the second application area. After the updated version of firmware is loaded, the processor may be reset in order to run the upgraded version of firmware. The software vector table may be filled with proper corresponding interrupt vector addresses for the interrupt vectors contained in the fixed vector table, as determined by the upgraded version of firmware.

The non-volatile programmable read only memory device may comprise a flash electrically erasable programmable read only memory device (FLASH). Those skilled in the art will recognize that other suitable types of non-volatile programmable read only memory devices may be utilized to the same effect.

A prior version of firmware may be running from one application area while the upgraded version of firmware is being loaded into the other application area.

An erasable programmable memory device (EPROM) or similar device may be provided which is used to determine the application area to be accessed after the resetting step.

The RAM application area may be loaded with data from the application area having the upgraded version of firmware.

The first application area may contain a first version of firmware and the second application area may contain a second version of firmware. The updated version of firmware may be loaded into either application area. The application area that does not receive the updated version of firmware may be used to store a backup copy of firmware. For example, the old version of firmware may be left in this application area, or this application area can subsequently be updated to so that the firmware in both application areas is the same.

In a preferred embodiment of the invention, the processor, the non-volatile programmable read only memory device, and the RAM are all provided in the form of a single integrated circuit.

DETAILED DESCRIPTION OF THE INVENTION

Figure 1:
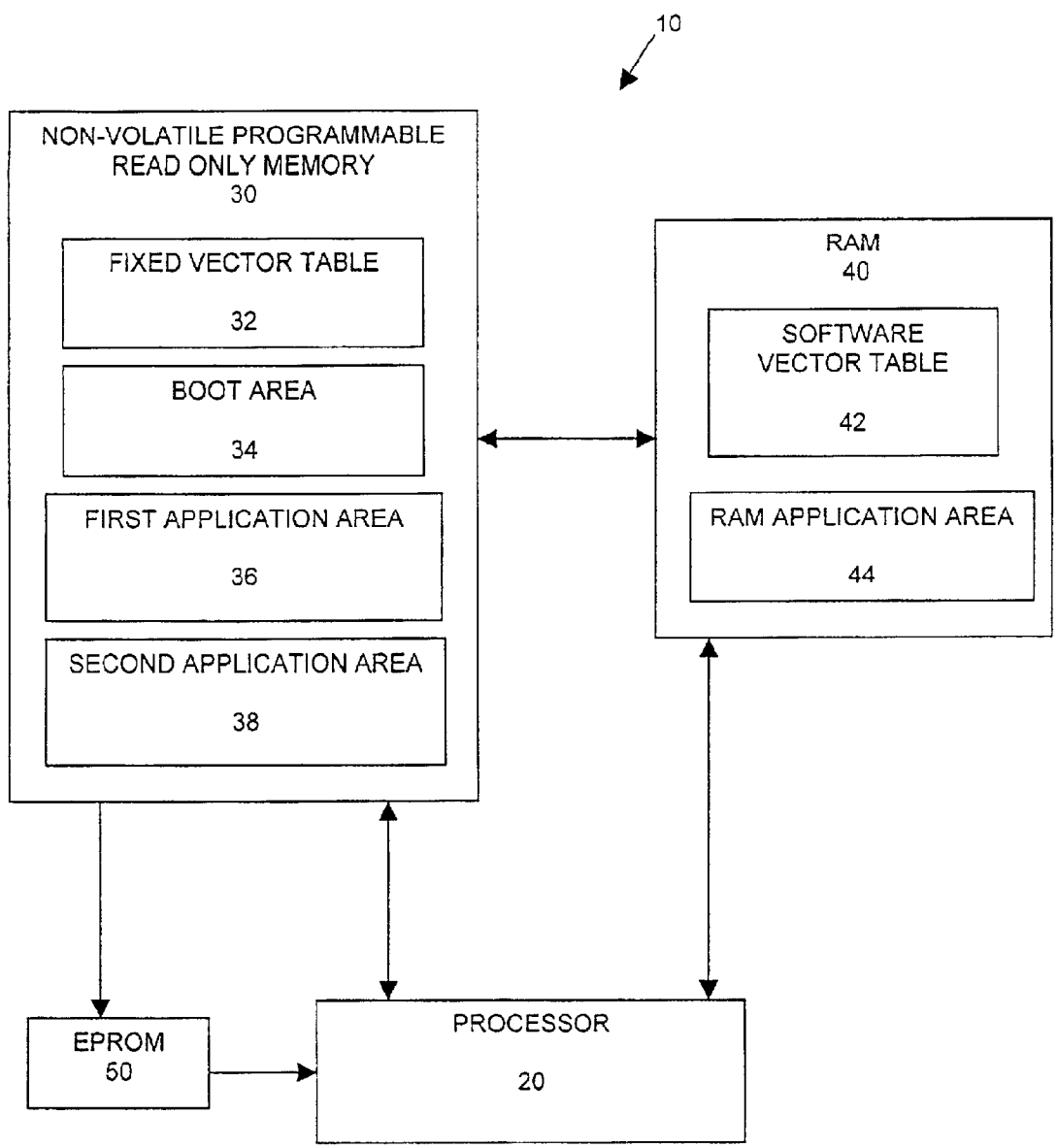
FIG. 1 is a block diagram of an illustrative embodiment of the invention.

An illustrative embodiment of the invention is shown in FIG. 1. A processor 20 is provided for use in an embedded system 10. A non-volatile programmable read only memory device 30 has a fixed vector table 32, a boot area 34 for storing boot code, a first application area 36 for storing firmware, and a second application area 38 for storing firmware. A random access memory device (RAM) 40 includes a software vector table 42 and a RAM application area 44. The fixed vector table 32 may be programmed with a reset vector address and interrupt vector addresses. The reset vector address points to the boot code in the boot area 34 and the interrupt vector addresses points to corresponding interrupt vector addresses in the software vector table 42. An upgraded version of firmware may be loaded into one of the first application area 36 or the second application area 38 of the programmable memory 30. After the updated version of firmware is loaded, the processor 20 may be reset in order to run the upgraded version of firmware. The software vector table 42 of RAM 40 is provided with proper corresponding interrupt vector addresses for the interrupt vectors contained in the fixed vector table 32, as determined by the upgraded version of firmware.

The non-volatile programmable read only memory device 30 may comprise a flash electrically erasable programmable read only memory device (FLASH). Those skilled in the art will recognize that other suitable types of non-volatile programmable read only memory devices may be utilized to the same effect.

A prior version of firmware may be running from one application area while the upgraded version of firmware is being loaded into the other application area.

An erasable programmable memory device (EPROM) 50 or similar device may be provided for use in determining the application area to be accessed after the resetting step.

The RAM application area 44 may be loaded with data from the application area having the upgraded version of firmware.

The first application area 36 of programmable memory 30 may contain a first version of firmware and the second application area 38 may contain a second version of firmware. The updated version of firmware may be loaded into either application area. The application area that does not receive the updated version of firmware may be used to store a backup copy of firmware. For example, the old version of firmware may be left in this application area, or this application area can subsequently be updated so that the firmware in both application areas is the same.

Figure 2:
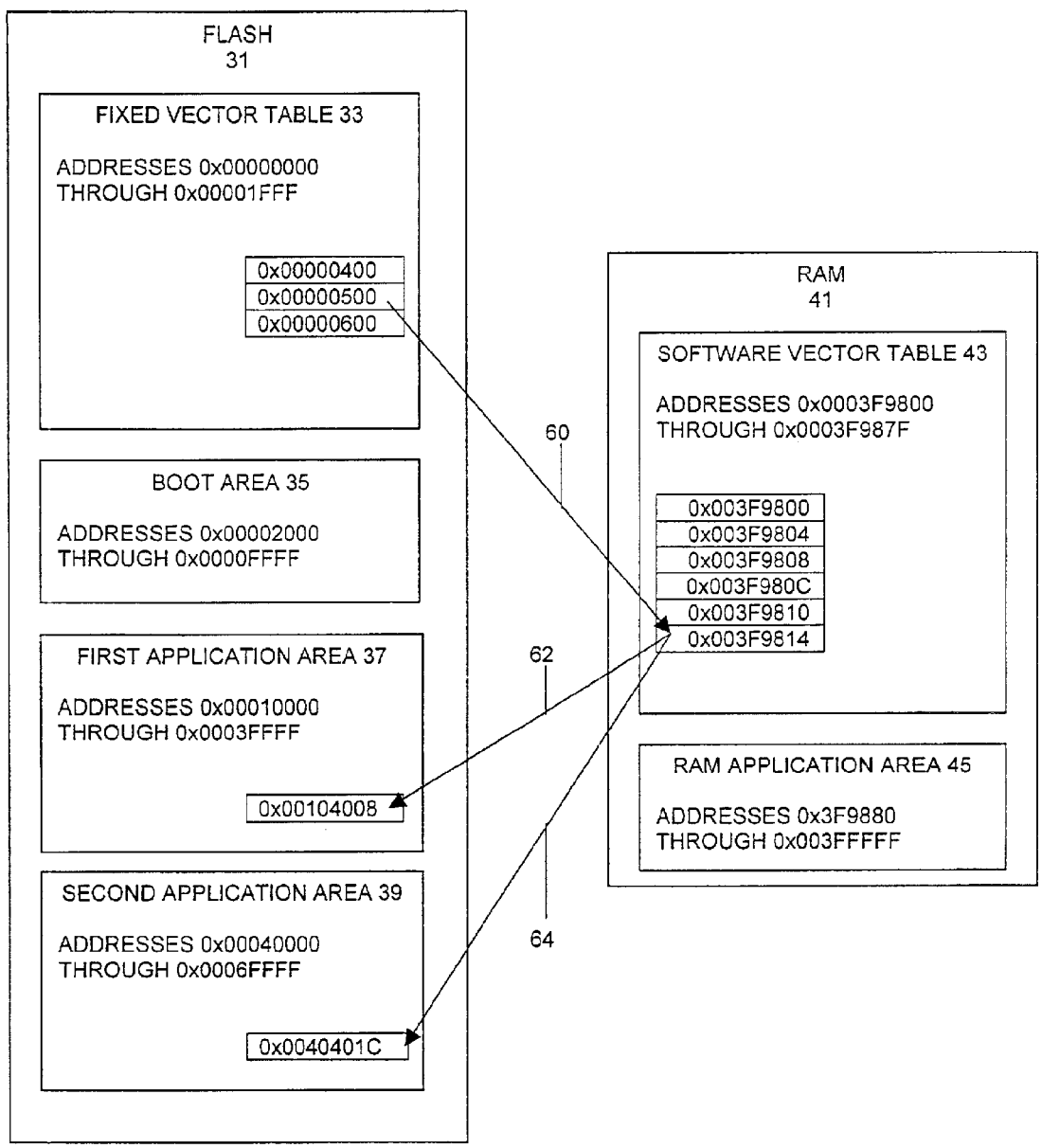
FIG. 2 is a block diagram of an illustrative embodiment of the non-volatile programmable read only memory device and the random access memory device of the invention.

FIG. 2 is a block diagram example of the contents of the non-volatile programmable read only memory device 30 and the RAM 40 of FIG. 1. FIG. 2 shows the non-volatile programmable read only memory device as FLASH 31. The available FLASH 31 memory areas are separated into two equally sized application areas, i.e., first application area 37 and second application area 39. The remaining FLASH space is divided into a fixed vector table 33 and a boot code area 35. The RAM 41 is separated into a software vector table 43 and an application area 45.

The fixed vector table 33 of FLASH 31 is shown as having addresses 0x00000000 through 0x00001FFF. The boot area 35 is shown as having addresses 0x00002000 through 0x0000FFFF. The first application area 37 is shown as having addresses 0x00010000 through 0x0003FFFF. The second application area 39 is shown as having addresses 0x00040000 through 0x0006FFFF.

The software vector table 43 of RAM 41 is shown as having addresses 0x0003F9800 through 0x0003F987F. The RAM application area is shown as having addresses 0x3F9880 through 0x003FFFFF. It should be appreciated by those skilled in the art that the foregoing description of the addresses assigned to each respective component (i.e., FLASH 31 and RAM 41) is for purposes of illustration only. Any set of addresses may be provided to each respective component as is well known in the art.

The fixed vector table 33 will be filled with addresses of the software vector table 43. Each software vector address may be in multiples of four. By providing the software vector table 43, the fixed vector table 33 in FLASH 31 can be programmed once and will never change. Each address in the fixed vector table 33 will point to an address in the software vector table 43. This will be true in the case of all the vectors except the reset vector. The reset vector will point to the boot area 35. Upon receiving a reset vector, the code will jump to the reset vector which will jump to the boot area 35 and execute the code to reset the module and initialize the system. As a part of the system initialization, the firmware will decide which bank of the application FLASH 37, 39 to use. Once that decision is made, the firmware will fill the software vector table 43 with the proper addresses of all the remaining interrupt vectors. Once this is completed, the system will run the selected firmware and the interrupt vectors will point to their proper interrupt service routines.

FIG. 2 also shows an example of a typical interrupt scenario. The fixed vector table 33 is shown as having contiguous interrupt vectors (e.g., 0x00000400, 0x00000500, and 0x00000600). When an interrupt, such as an external reset, is recognized by the processor, the processor stops what it is doing and obtains the next instruction from, for example, address 0x00000500, as indicated by the interrupt. As shown by arrow 60, the instruction coded in address 0x00000500 will be a branch to a corresponding location in software vector table 43, which in this case is 0x003F9814. If the first application area 37 loaded software vector table 43 location 0x003F9814, it could load that location with yet another branch instruction to a location within the first application area 37 as shown by arrow 62, e.g., location 0x00104008. If, on the other hand, the second application area 39 loaded software vector table 43 location 0x003F9814, this location could contain, for example, a branch to second application area 39 location 0x0040401C, as shown by arrow 64.

Figure 3:
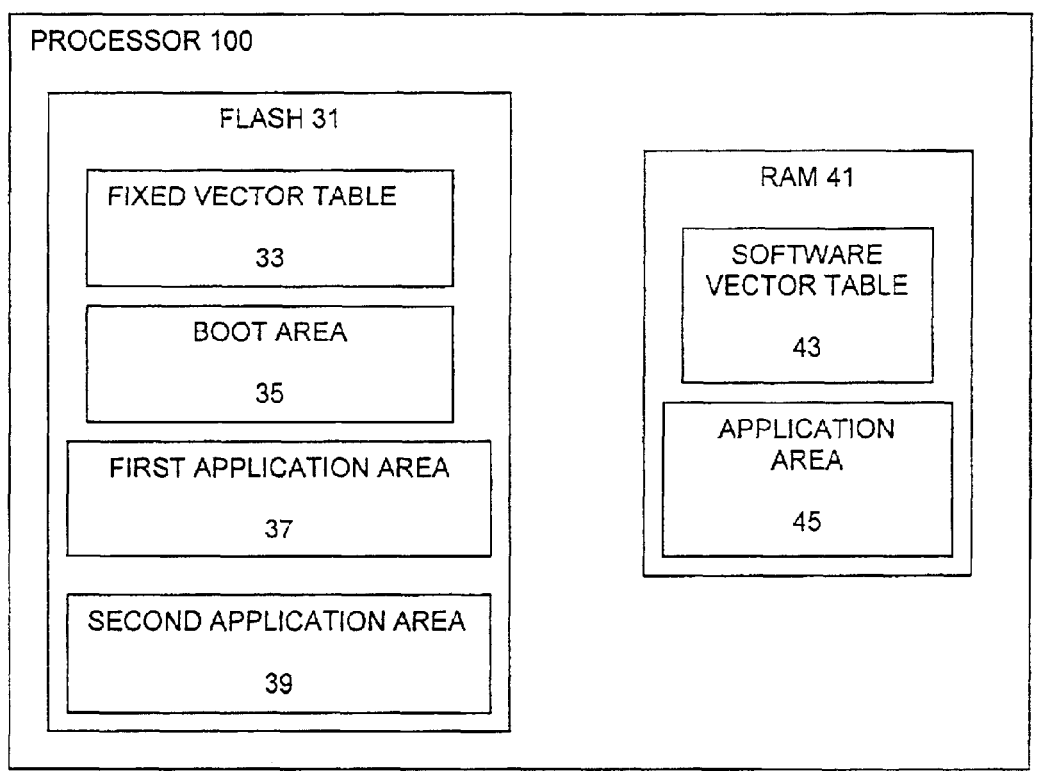
FIG. 3 is a block diagram of a preferred embodiment of the invention.

In a preferred embodiment of the invention as shown in FIG. 3, the processor 100, the non-volatile programmable read only memory device 31 (shown as FLASH in FIG. 3), and the RAM 41 are all provided in the form of a single integrated circuit (e.g., processor 100). For example, Motorola processor part no. MPC555 contains two banks of FLASH able to be read from and written to at the same time and a bank of RAM which can hold the appropriate amount of data needed to implement the present invention. The FLASH and RAM can be further segmented as described above to provide the functionality of the present invention in a single part.

It should now be appreciated that the present invention provides advantageous methods and apparatus for upgrading firmware in an embedded system without impacting the system. The present invention is particularly useful when upgrading an embedded system utilizing a fixed vector table. Further, the present invention is particularly useful when upgrading system firmware while the system is running.

Although the invention has been described in connection with various illustrated embodiments, numerous modifications and adaptations may be made thereto without departing from the spirit and scope of the invention as set forth in the claims.

What is claimed is:

1. A method for upgrading firmware in an embedded system, comprising the steps of:
   providing a processor;
   providing a non-volatile programmable read only memory device having a fixed vector table, a boot area for storing boot code, a first application area for storing firmware, and a second application area for storing firmware;
   providing a random access memory device (RAM) having a software vector table and a RAM application area;
   programming the fixed vector table with a reset vector address and interrupt vector addresses, said reset vector address pointing to the boot code in said boot area and said interrupt vector addresses pointing to corresponding interrupt vector addresses in the software vector table;
   loading an upgraded version of firmware into one of the first application area or the second application area;
   resetting the processor to run the upgraded version of firmware; and
   filling the software vector table with proper corresponding interrupt vector addresses for the interrupt vectors contained in the fixed vector table as determined by the upgraded version of firmware;
   wherein:
   in the event an interrupt is generated, the processor obtains a next instruction from one of the interrupt vector addresses of the fixed vector table in accordance with said interrupt;
   said next instruction points to a corresponding location in the software vector table; and
   said corresponding location in the software vector table points to a corresponding location in one of said first or second application areas.

2. A method in accordance with claim 1, wherein the non-volatile programmable read only memory device comprises a flash electrically erasable programmable read only memory device (FLASH).

3. A method in accordance with claim 1, wherein a prior version of firmware is running from one application area while the upgraded version of firmware is being loaded into the other application area.

4. A method in accordance with claim 1, further comprising:
   providing an erasable programmable memory device (EPROM) which is used to determine which application area will be accessed after the resetting step.

5. A method in accordance with claim 1, further comprising:
   loading the RAM application area with data from the application area having the upgraded version of firmware.

6. A method in accordance with claim 1, wherein:
   the first application area contains a first version of firmware; and
   the second application area contains a second version of firmware.

7. A method in accordance with claim 1, wherein said processor, said non-volatile programmable read only memory device, and said RAM are all provided in the form of a single integrated circuit.

8. An upgradable embedded system apparatus, comprising:
   a processor;
   a non-volatile programmable read only memory device having a fixed vector table, a boot area for storing boot code, a first application area for storing firmware, and a second application area for storing firmware; and
   a random access memory device (RAM) having a software vector table and a RAM application area;
   wherein:
   the fixed vector table is programmed with a reset vector address and interrupt vector addresses, said reset vector address pointing to the boot code in said boot area and said interrupt vector addresses pointing to corresponding interrupt vector addresses in the software vector table;

an upgraded version of firmware is loaded into one of the first application area or the second application area;

the processor is reset to run the upgraded version of firmware;

the software vector table is filled with proper corresponding interrupt vector addresses for the interrupt vectors contained in the fixed vector table as determined by the upgraded version of firmware;

in the event an interrupt is generated, the processor obtains a next instruction from one of the interrupt vector addresses of the fixed vector table in accordance with said interrupt;

said next instruction points to a corresponding location in the software vector table; and said corresponding location in the software vector table points to a corresponding location in one of said first or second application areas.

9. Apparatus in accordance with claim 8, wherein the non-volatile programmable read only memory device comprises a flash electrically erasable programmable read only memory device (FLASH).

10. Apparatus in accordance with claim 8, wherein a prior version of firmware is running from the one application area while the upgraded version of firmware is being loaded into the other application area.

11. Apparatus in accordance with claim 8, further comprising:

an erasable programmable memory device (EPROM) which is used to determine which application area will be accessed after the resetting step.

12. Apparatus in accordance with claim 8, wherein:

the RAM application area is loaded with data from the application area having the upgraded version of firmware.

13. Apparatus in accordance with claim 8, wherein:

the first application area contains a first version of firmware; and the second application area contains a second version of firmware.

14. Apparatus in accordance with claim 8, wherein said processor, said non-volatile programmable read only memory device, and said RAM are all provided in the form of a single integrated circuit.

* * * * *